Patented Sept. 5, 1933

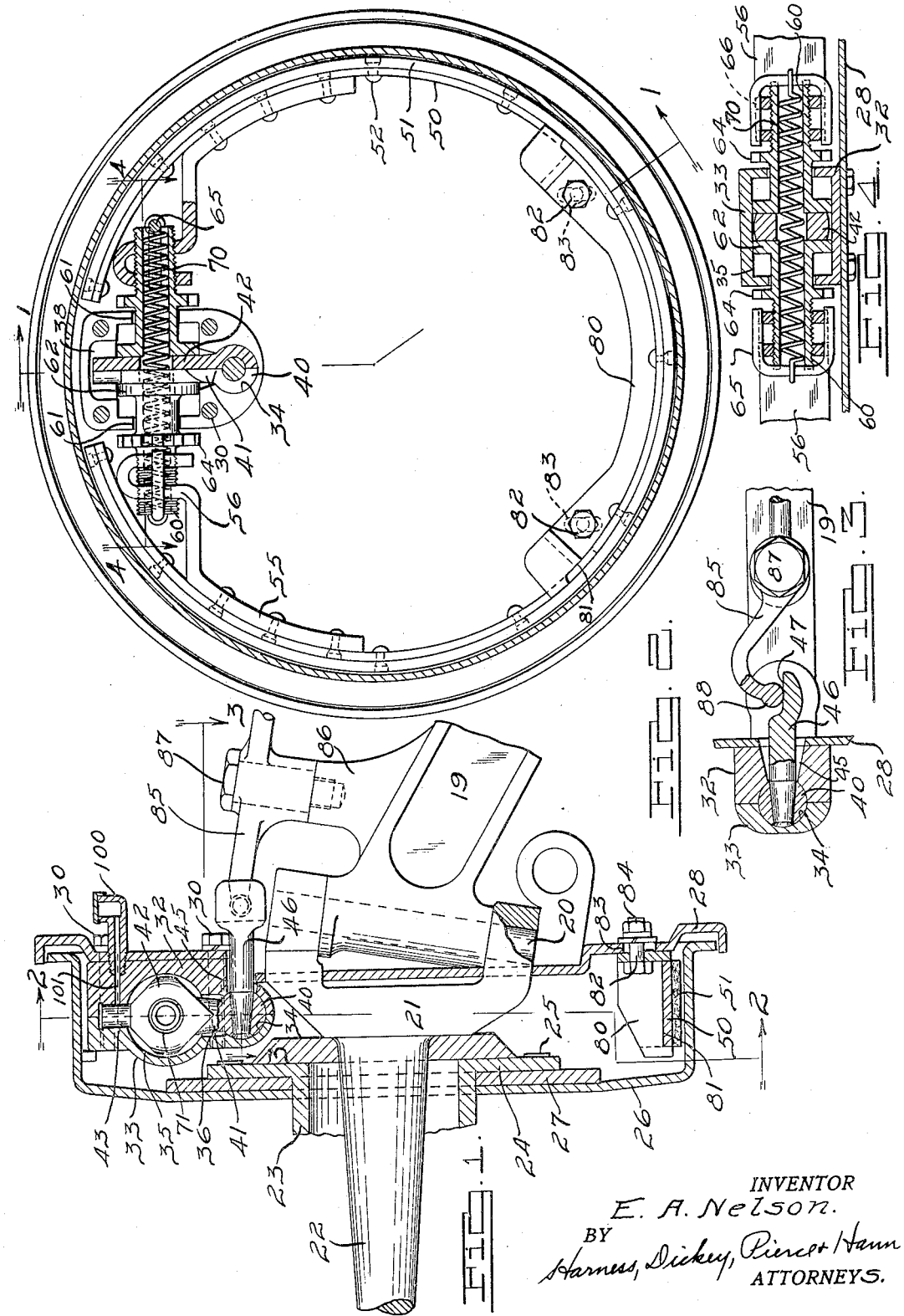

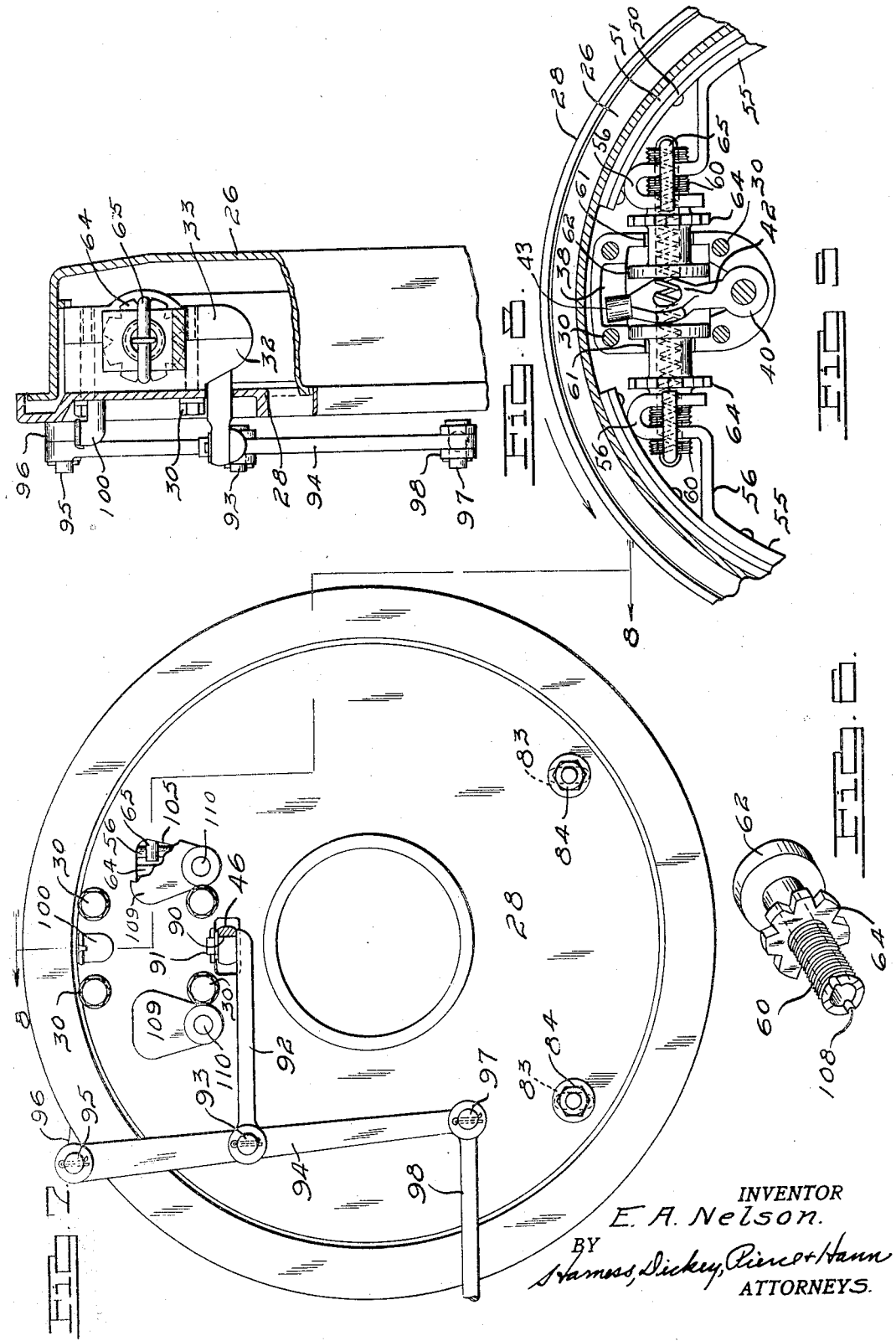

1,925,597

UNITED STATES PATENT OFFICE 1,925,597

BRAKE

Emil A. Nelson, Detroit, Mich.

Application February 1, 1930. Serial No. 425,299

17 Claims. (Cl. 188—78)

This invention relates to brakes, and particularly to that type thereof adaptable for use in connection with motor vehicles.

The objects of the present invention are to provide a brake that is simple in construction, efficient in operation, and economical to manufacture; to provide a brake of the band type in which the band is bodily movable in the application of the brake, whereby a more efficient wrapping action may be obtained; to provide a wrapping type of brake that is equally effective upon application regardless of the direction of rotation of the wheel with which it co-operates; to provide a new and novel type of brake expanding means; to provide a new and novel means for taking up the wear in a brake of the type described; and to provide certain novel features of construction that will be hereinafter apparent in the following specification, reference being had to the accompanying drawings, in which Fig. 1 is a vertical sectional view, as on the line 1—1 of Fig. 2, taken through the axis of a brake mechanism mounted upon the front axle of a motor vehicle.

Fig. 2 is a face view of the brake mechanism shown in Fig. 1 taken from the right hand side of Fig. 1, the axle and backing plate being removed to better illustrate the construction, and part of the brake expanding means being shown in section taken as on the line 2—2 of Fig. 1.

Fig. 3 is a fragmentary, partially broken, sectional view taken as on the line 3—3 of Fig. 1.

Fig. 4 is a fragmentary sectional view taken approximately on the line 4—4 of Fig. 2.

Fig. 5 is an enlarged fragmentary view similar to that shown in the upper portion of Fig. 2 and illustrating the movement of the expanding cam during application of the brake.

Fig. 6 is a perspective view of one of the cam adjusting members.

Fig. 7 is a face view of the brake taken from the inside of the wheel and illustrating the mechanism employed when adapting it for a rear wheel brake.

Fig. 8 is a fragmentary sectional view taken as on the line 8—8 of Fig. 7.

Referring to the accompanying drawings, I show in Fig. 1 a portion of an automobile front axle 19 to which is pivotally secured by means of the king pin 20 a steering knuckle 21 provided with the usual wheel spindle 22. Rotatably mounted upon the wheel spindle 22 by suitable bearings (not shown) is a wheel hub 23 provided with the usual radially extending flange 24. Secured to the flange 24 by rivets such as 25 or other suitable means is a brake drum 26 of conventional construction, a stiffening plate such as 27 being preferably inserted between the brake drum 26 and the flange 24 as in conventional constructions. The open face of the brake drum is closed by a backing plate 28 which is rigidly secured to the steering knuckle 21 by suitable means not shown. Within the brake drum 26 adjacent the top thereof and rigidly secured to the backing plate 28 by bolts such as 30 is a housing comprising the parts 32 and 33. The line of split between the parts 32 and 33 is in a plane parallel to the backing plate 28. Adjacent the bottom of this housing and between the contacting faces of the parts 32 and 33 is formed a spherical recess 34. The housing is also recessed as at 35 above the recess 34 and is connected thereto by the connecting recess 36. The recess 35 is extended toward the periphery of the brake drum 26 in the form of an elongated groove 38 lying in a plane parallel to the backing plate 28, and is equally disposed on either side of the line of split between the parts 32 and 33.

Received within the spherical recess 34 is a ball member 40 provided with a shank 41 on which is formed a relatively flat cam 42 disposed within the recess 35. The cam 42 is provided with an extending trunnion 43 which is slidably and rotatably received within the groove 38. The part 32 and the backing plate 28 are slotted as at 45 and extending through the slot 45 is an arm member 46, one end of which is rigidly secured to the ball 40. The outer end of the arm 46 is provided with a vertically disposed flat face 47 (see Fig. 3). The plane of this face 47 preferably includes the axial line of the king pin 20 and wheel spindle 22 when the brake is in applied position.

Received within the brake drum 26 is a flexible band brake member 50 provided with the usual friction facing 51 suitably secured thereto by means of rivets such as 52 or other suitable means. The free ends of the brake element 50 terminate in spaced but adjacent relationship with respect to the casing 32—33. Secured adjacent each end of the brake element 50 is a relatively rigid member 55, shown as being formed from strap-like metal and provided with a U-shaped end 56, one side of which is adapted to lie in substantially parallel relationship with respect to the corresponding side face of the casing 32—33. The member 55 is preferably so shaped that the bottom of the U 56 lies in contacting relation with respect to the adjacent portions of the band element 50 for reinforcing purposes. Threaded through each of the legs of each of the U's 56 in a direction perpendicular to the adjacent face of the casing 32—33 is a hollow screw member 60 (shown in perspective in Fig. 6), these screw members normally lying in substantially axially coincident relation. The inner ends of the screw members 60 project through openings 61 in the casing 32—33 and within the recess 35 each is provided with an enlarged head portion 62. Between each of the U-portions 56 and the adjacent face of the casing 32—33, each screw member 60 is provided with a peripherally notched radially extending flange portion 64, the purpose of which will be presently described. Over the outer end of each of the screw members 60 is received a U-shaped wire member 65 guided axially of the screw 60 in slots 66 (see Fig. 4) formed in the side edges of the corresponding U-end 56. A coil spring 70 received within the hollow interior of the screw 60 and, extending through the central opening 71 in the cam 42, is hooked over the ends of the wires 65 and is held under tension therebetween. This spring consequently tends to draw the members 55, and consequently the free ends of the brake element 50, inwardly toward each other, and at the same time the heads 62 of the screws 60, contacting against the opposite faces of the cam 42, tend to rotate the cam 42 so that its faces lie in parallelism with the adjacent faces of the heads 62, and consequently tends to move the lever 46 into a predetermined position.

Secured to the backing plate adjacent the bottom thereof is a guide member 80 for the brake element 50. This guide member 80 is arcuate in shape and is formed to provide a pair of radially extending surfaces alternately engaging opposite side edges of the brake element 50 so as to guide the brake element 50 against movement axially of the brake drum. The ends of the guide 80 are formed to provide abutments 81 which act to limit the distance which the brake element may retract from the drum 26 at these points when the brake is in released position. The guide 80 is secured to the backing plate 28 by bolts 82 which extend through elongated slots 83 in the backing plate 28 and are provided exteriorly thereof with suitable nuts 84. By loosening the nuts 84 the guide 80 may be shifted relative to the brake drum 26 in order to radially adjust the abutting faces 81 to take up any wear that may occur in the brake lining 51.

In the operation of the brake means are provided for rocking the arm 46 about a line perpendicular to its length and passing through the center of the ball 40, the cam 42 and trunnion 43. It will be obvious that when the arm 46 is rocked about such a line the cam 42 will also be rocked or rotated about such line and in rotating will bear against the heads 62 of the screws 60 and will force them apart until the brake element 50 has been expanded sufficiently to engage the brake drum 26. As soon as the brake element 50 has been expanded sufficiently to engage the brake drum 26, the friction between the brake element and the drum will tend to rotate the brake element with the drum, and this movement of the brake element will actually occur until one of the flange members 64 on the screw 60 abuts against the adjacent face of the casing 32—33, which will then prevent the corresponding end of the brake element from rotating any further in that direction. During this bodily rotating movement of the brake element 50 the cam member 42 will move a corresponding amount about the center of the ball 40, as indicated in Fig. 5, it being guided in this movement by the trunnion 43 which is guided in the groove 38. As soon as one of the flanges 64 abuts against the casing 32—33, further rotation of the cam 42 will merely force the free end of the band further outwardly into contact with the brake drum 26 and will act to effect a more severe application of the brake. Upon release of the pressure attempting to turn the arm 46, the spring 70 will tend to draw the free end of the brake elements together, and not only will return the brake elements to non-braking position but will also return the cam 42 and arm 46 to non-braking position.

Any suitable means may be provided for rotating the arm 46. The particular means shown in Figs. 1 and 3 comprises a double arm lever 85 pivotally mounted on a boss 86 formed on the end of the axle 19 by means of a pin such as 87. The outer end of the lever 85 is preferably provided with a ball end 88 adapted to lie in contact with the flat face 47 on the outer end of the arm 46. The inner end of the lever 85 may be connected to a foot pedal (not shown) by any conventional form of linkage (not shown), so that application of pressure to the foot pedal will cause the lever 85 to rotate in a counter-clockwise direction as viewed in Fig. 3, and in rotating the ball 88 will bear against the flat face 47 and cause the lever 46 to rotate about a line passing through the center of the ball 40, as previously described. Any other suitable means may be provided for causing rotation of the arm 46. The particular construction shown is desirable for use in connection with front wheel brakes inasmuch as the brakes may be adjusted so that the point of contact between the ball 88 and the face 47 may lie on a line coincident with the axis of the king pin 20 when the brake is applied, so that the turning of the wheels for steering purposes during application of the brakes will have no effect whatsoever upon the application of the brakes.

When the brake is to be employed upon the rear wheels of the motor vehicle it is not necessary to consider the effect of steering on the application of the rear wheel brakes. Accordingly, in such a case the outer end of the arm 46 may be provided with a vertically extending aperture 90 (see Fig. 7) in which may be rotatably received the end 91 of a rod such as 92. The rod 92 may be directly connected with a conventional linkage extending to the foot pedal, but I prefer to connect it by means of a pin such as 93 to a lever such as 94 between the ends of such lever, and to pivotally connect such lever by means of a pin such as 95 to a bracket such as 96 formed on the backing plate 28. The opposite end of the lever 94 may then be connected by a pin such as 97 to a rod such as 98 forming a part of a conventional brake linkage system.

Any suitable means may be provided for introducing lubricant into the various recesses formed between the housing parts 32—33. One such means is shown in Fig. 1 and comprises an oil cup 100 threaded through the backing plate 28 and into the housing part 32, where it is connected with the groove 38 by means of a passage 101.

For the purpose of ease in adjusting the brake I provide a pair of openings 105 in the backing plate 28 in line with each of the flange members 64 on the screws 60, and I serrate the periphery of each of the flange members 64 so that by inserting a screw driver or other instrument to the openings 105 and engaging the periphery of the corresponding flange member 64 therewith, I am enabled to turn the corresponding screw 60 in the U-shaped end 56 and thereby shift the position of the corresponding screw 60 with respect to the end 56 in order to compensate for any wear that may have occurred to the lining 51. In order to prevent inadvertent movement of the screw member 60 after adjustment, I prefer to form diametrically opposite grooves 108 (see Fig. 6) in the outer end of the screw member 60 so that the U-shaped wire 65 will seat in such groove and be retained there by the tension on the spring 70. The U-shaped wire members 65 may be readily worked out of their corresponding grooves 108 when it is desired to rotate the screw members 60 by engaging to the flanges 64. Flat covers such as 109 pivotally secured to the backing plate 28 by a rivet 110 or other suitable means, are preferably provided for covering up the openings 105 except when it is desired to adjust the brake.

It may be emphasized, in conclusion, that although the heads of the cams 62, near the ends of the band 50, are provided with positive guidance by the housing elements 32, 33, the movements imparted to said end-carried cams and adjacent parts, in response to pressure applied thereto by the oppositely-acting faces of the torque-receiving cam 42 are such, regardless of the angular inclination of said cam 42, as not only to afford great mechanical advantage but substantially to obviate friction during application of the brake. This important result ensues largely from the simple and effective shapes and relationships of mentioned cooperating parts, and also from the positions of the abutments 56, slidable adjacent the free extremities of the band 50; and it is also favored by the tendency of the single retracting spring 70 extending through the mentioned cams, and holding the end-carried cams against the torque-receiving cam 42. The slidable fit of the positively guided heads 62 or other portions of the separately adjustable and releasably locked threaded cams referred to, will however be seen to obviate all risk of wobble or uncertainty of action during the radial expansion of the friction-applying organization which includes the band 50; and the illustrated one-piece guide 60 will be seen to include not only radially disposed members for slidable engagement by said band but also an arcuate edge and spaced terminal portions so offset as to obviate undue lateral movement of said band. The mode of construction and interconnection of novel bearing parts, including ball 40 and trunnion 43, as well as the employment of the mentioned outwardly movable abutments 56, will be seen not only to accord with the use of a band 50 having exceptional length but to adapt the same to be promptly and effectively applied during either a forward or a backward movement of any vehicle whose wheels are equipped therewith,—the motion imparted by the cam 42 being, in either case, a maximum at the beginning of its rotation about its longitudinal axis and automatically but controllably carried to completion in the general manner described.

It will be apparent that in this brake, regardless of the direction of rotation of the brake drum, each application of the brake will necessitate an initial bodily rotatable movement of the brake element 56 and, as is well known in the art, this bodily movement of the brake element tends to wrap the brake element into the brake drum and insures a more efficient co-operation between the brake element and the brake drum upon application of the brake. This feature of the brake is, therefore, highly desirable and results in a highly efficient brake. Furthermore, it will be apparent that both parts of the brake may be made from stampings or strip metal, and is, therefore, very economical to produce.

Formal changes may be made in the specific embodiment of the invention described without departing from the spirit and substance of the broad invention, the scope of which is commensurate with the appended claims.

I claim:

1. In a vehicle wheel brake: a drum; a drum-closing plate; a housing secured within said plate and provided with bearings for a cam element; a cam element rotatable in said bearings and provided with oppositely-acting cam faces; and an expansible friction-applying organization including a band whose end portions carry cam elements for engagement by said faces,—said end-carried cam elements being provided with means for a separate adjustment thereof relatively to the end portions of said band.

2. In a vehicle wheel brake: a drum; a drum-closing plate; a housing secured within said plate and provided with bearings for a cam element; a cam element rotatable in said bearings and provided with oppositely-acting cam faces; and an expansible friction-applying organization including a band whose end portions carry cam elements for engagement by said faces,—said end-carried cam elements being tubular and interconnected by a spring extending therethrough.

3. In a vehicle wheel brake: a drum; a drum-closing plate; a housing secured within said plate and provided with bearings for a cam element; a cam element rotatable in said bearings and provided with oppositely-acting cam faces; and an expansible friction-applying organization including a band whose end portions carry cam elements slidably supported for engagement by said faces,—said end-carried cam elements being tubular and interconnected by a spring extending therethrough, and the ends of said spring being secured by means releasably locking said end-carried cam elements against rotation.

4. In a vehicle wheel brake: a drum; a drum-closing plate; a housing secured within said plate and provided with bearings for a cam element; a cam element rotatable in said bearings and provided with oppositely-acting faces; and an expansible friction-applying organization including a band whose end portions carry cam elements for engagement by said faces,—the first mentioned cam element being mounted for rotation on either of two intersecting axes.

5. In a vehicle wheel brake: a drum; a drum-closing plate; a housing secured within said plate and provided with bearings for a cam element; a cam element rotatable in said bearings and provided with oppositely-acting cam faces; and an expansible friction-applying organization including a band whose end portions carry cam elements slidably supported for engagement by said faces,—said cam element including a ball from which projects an operating arm.

6. In a vehicle wheel brake: a drum; a drum-closing plate; a housing secured within said plate and provided with bearings for a cam element; a cam element rotatable in said bearings and provided with oppositely-acting cam faces; and an expansible friction-applying organization including a band whose end portions carry cam elements for engagement by said faces,—said element being provided with an arm and with a trunnion which is slidably and rotatively received within said housing.

7. In a vehicle wheel brake: a drum; a drum-closing plate; a housing secured within said plate and provided with bearings for a cam element; a cam element rotatable in said bearings and provided with oppositely acting cam faces; and an expansible friction-applying organization including a band whose end portions carry cam elements slidably supported for engagement by said cam element,—said torque-receiving cam element being provided with a ball, at one end thereof, with a bearing trunnion at the other end thereof, and with means for imparting rotation thereto regardless of the position of said trunnion.

8. In a vehicle wheel brake: a drum; a drum-closing plate; a housing secured within said plate; an expansible friction-applying organization including a band whose end portions carry cam elements, a guide for said band; and band-expanding means supported by said housing,—said band being dependently supported by said end-carried cam elements and said guide being adjustably secured to said plate.

9. In a vehicle wheel brake: a drum; a drum-closing plate; a housing secured within said plate and provided with bearings for a cam element; a cam element rotatable in said bearings and provided with oppositely-acting faces; and an expansible friction-applying organization including a band whose end portions carry cam elements slidably supported by said housing for engagement by said faces,—said band being longitudinally movable as a unitary structure in either direction and upon frictional engagement with said drum, within limits permitted to said end-carried cams by the slidable disposition thereof within said housing.

10. In a vehicle wheel brake: a drum; a drum-closing plate; a housing secured within said plate and provided with bearings for a cam element; a cam element rotatable in said bearings and provided with oppositely-acting cam faces; and an expansible friction-applying organization including a band whose end portions carry cam elements slidably supported for engagement by said faces,—said band being provided with free and upwardly convergent terminal portions, and with abutment means for supporting said terminals against undue inward movement.

11. In a vehicle wheel brake: a drum; a drum-closing plate; a housing secured within said plate; an expansible friction-applying organization including a dependent band whose end portions carry cam elements; and a band-expanding cam supported by said housing and engaging the cam elements,—said band being provided with adjustable means, slidably engaged by said band, for varying the spacing of a lower portion thereof from said drum.

12. In a vehicle wheel brake: a drum; a drum-closing plate; and an expansible friction-applying organization including a band,—said plate being provided with an arcuate and adjustable guide means limiting radial inward movement of said band, but permitting a longitudinal sliding movement thereof.

13. In a vehicle wheel brake: a drum; a drum-closing plate; cams oppositely guided relatively to said plate; means acting oppositely on said cams; and a band dependently supported from said cams,—said band being provided with U-shaped ends and said cams and ends being threaded for mutual engagement.

14. In a vehicle wheel brake: a drum; a drum-closing plate; cams oppositely guided relatively to said plate; means acting oppositely on said cams; and a band dependently supported from said cams,—said plate being provided with adjustable take-up means slidably engaged by said band, and said band being adjustably secured to said cams by means accessible through said plate.

15. In a vehicle wheel brake: a drum; a drum-closing plate; and a band dependently supported within said drum; and a take-up member for said band,—said plate being provided with substantially parallel slots and said take-up member being secured to said plate by bolts extending through said slots.

16. In a brake mechanism, in combination, a brake drum, a brake element mounted therein for co-operation therewith, a supporting member, a housing carried by said member between the ends of said element and adapted to contact with one of said ends for taking the braking torque, means at least partially disposed within said housing for moving said element into contact with said drum, and means secured to said moving means for causing operation thereof, said housing and both of said means constituting a unitary assemblage applicable to and removable from said member as such.

17. In a brake mechanism, in combination, a drum, a friction element mounted therein for co-operation therewith, a supporting member, a housing carried by said supporting member between the ends of said element, a brake expanding member at least partially disposed in said housing and provided with an opening therein, and spring means extending through said opening and constantly urging said element toward contracted position.

EMIL A. NELSON.